United States Patent [19]
Glynn et al.

[11] Patent Number: 5,545,069
[45] Date of Patent: Aug. 13, 1996

[54] ILLUMINABLE TOYS AND SIMULATIONS WITH REPLACEABLE ILLUMINABLE EDIBLES

[75] Inventors: Kenneth P. Glynn, Raritan Township, Hunterdon County; James R. Blair, II, Phillipsburg, both of N.J.

[73] Assignee: Ideal Ideas, Inc., Flemington, N.J.

[21] Appl. No.: 410,055

[22] Filed: Mar. 24, 1995

[51] Int. Cl.⁶ ..................................................... A63H 3/00
[52] U.S. Cl. .......................... 446/73; 446/76; 446/71; 446/219; 446/386; 446/485; 362/253; 362/806; 362/808; 426/104
[58] Field of Search .................................. 446/71–73, 75, 446/76, 79, 219, 386, 485; 362/253, 806, 808; 40/406, 410, 411; 426/104

[56] References Cited

U.S. PATENT DOCUMENTS

| | | |
|---|---|---|
| D. 242,645 | 12/1976 | Shorin et al. . |
| D. 242,646 | 12/1976 | Shorin et al. . |
| 328,867 | 10/1885 | Van Leeuwen ........................ 426/104 |
| 2,085,414 | 6/1937 | Cavanagh . |
| 2,532,729 | 12/1950 | Millstein . |
| 2,663,866 | 12/1953 | Simpson ................................ 426/104 |
| 2,815,439 | 12/1957 | Plubell ................................... 362/806 |
| 4,593,817 | 6/1986 | Ferrero . |
| 4,914,748 | 4/1990 | Schlotter ............................... 426/104 |
| 4,978,030 | 12/1990 | Morris et al. . |
| 5,117,338 | 5/1992 | McCrary ................................ 362/806 |
| 5,439,407 | 8/1995 | Friedel .................................. 362/806 |

FOREIGN PATENT DOCUMENTS

| | | | |
|---|---|---|---|
| 2324344 | 12/1974 | Germany ............................... 426/104 |
| 5153911 | 6/1993 | Japan ..................................... 426/104 |

Primary Examiner—Mickey Yu
Assistant Examiner—Jeffrey D. Carlson
Attorney, Agent, or Firm—Kenneth P. Glynn

[57] ABSTRACT

The illuminable toy has a replaceable, illuminable edible, that can be soft or hard crystal candy or any other translucent or transparent food in a figure form which is attached to a holder which is in turn part of or attached to a base. Concealed inside the base are a light source and battery connected to an electrical switch. The illuminable edible toy can be a simulation toy with more than one replaceable, illuminable edible under a cover. The base can have a cover simulating a coffin or horror house for conveying horror themes, or simulating an egg shell for conveying an Easter celebration theme or a cave for conveying a fairy tale mining cave theme.

6 Claims, 4 Drawing Sheets

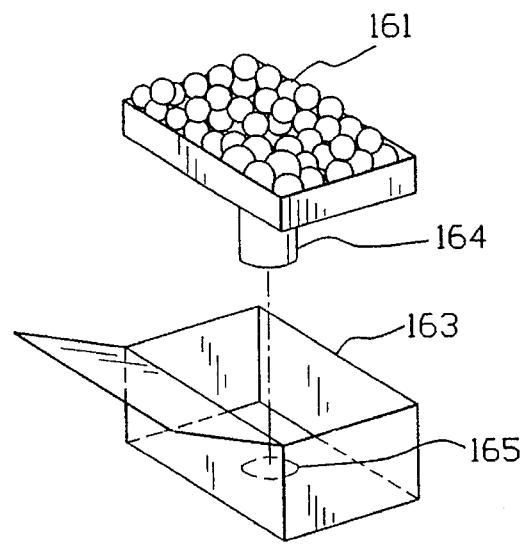
FIG. 13
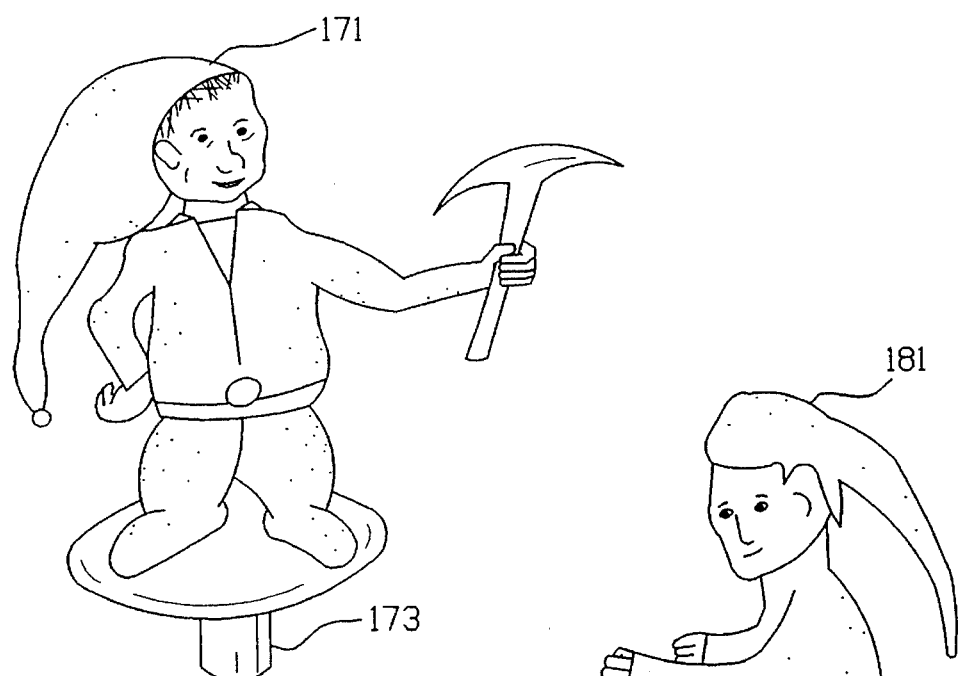
FIG. 14
FIG. 15

ILLUMINABLE TOYS AND SIMULATIONS WITH REPLACEABLE ILLUMINABLE EDIBLES

BACKGROUND OF THE INVENTION

1. Field of the Invention

The present invention involves toys with illuminable edibles either as a single toy figure or as a simulation toy with several illuminable edibles.

2. Information Disclosure Statement

The combination of illuminable edibles illumed by a switchable battery powered light source has not been taught by the prior art. The teaching of edibles as a toy component has been limited to simple configurations such as candy necklaces, candy rings, and simple candy containers.

CE DE CANDY INC., teaches the use of edibles resembling miniature donuts, sold under the registered trademark "SMARTIES", strung together and sold as a necklace.

The TOPPS COMPANY INC., under U.S. Pat. Nos. De. 242646/242645 teach the use of a hard translucent candy resembling a gem attached to a finger ring holder under the trademark "RING POP".

U.S. Pat. No. 2,532,729 issued to Millstein, involved a transparent container formed and colored like the body of Santa Claus open at the top and having a closure in the form of the head of Santa Claus. The head threaded onto the body in such a manner that less than half a turn was needed to assure a tight connection. Inside the transparent container or body were multi-colored candies.

U.S. Pat. No. 2,085,414 issued to Cavanagh, involved a container for packaging candies for children. The container simulated the face of a character, such as a person, with eye-like openings. Adjustments on the container provided for the rearranging of the colored candies inside to change the colors of the eye-like openings for amusement.

U.S. Pat. No. 4,508,512 issued to Girsch et al., involved a shape-matching toy with a first plate having a plurality of different shape apertures therein and a plurality of block elements of corresponding shapes which are receivable in the apertures.

U.S. Pat. No. 4,978,030 issued to Morris et al., involved a candy container configured as a fowl or the like with the contained candy shaped like an egg. Squeezing or compressing the container caused an egg to be ejected from an orifice on the bottom of the container and simultaneously generating air pressure to activate a reed-type sound generator located in the bill of the container.

U.S. Pat. No. 1,574,071, issued to Dvorsky involved a dispensing container for cigars, cigarettes and like small cylindrical objects. The container employed interconnected idler wheels, string and pulleys, springs, screws and linkages to segregate one article from the container by depressing a single key.

U.S. Pat. No. 4,593,817, issued to Ferrero involved a container for food products consisting of two trough shaped bodies which could be joined together releasably at their complementary free edges. One of the free edges had a notch which defined a slot with the other free edge when the bodies were joined together. The two bodies had appendages shaped so as to give the container an animal-like appearance, and some of the appendages served to support the container with the slot facing upwards.

U.S. Pat. No. 5,386,909, issued to Spector, involved a display package housing a cylindrical, transparent container whose externally-threaded neck received a screw-on cap. The container could be filled with shaped candy pieces having a figurative form such as that of miniature bears. The package was a hollow plastic figure whose form was similar to that of the smaller shaped candy pieces inside the container.

Notwithstanding the prior art, the combination of illuminable edibles illumed by a battery powered light source as taught by the present invention is neither taught nor rendered obvious thereby.

SUMMARY OF THE INVENTION

The present invention is an illuminable edible toy having a replaceable, illuminable edible that can be crystal candy or other translucent or transparent food, in the form of crystals, characters such as Santa Claus, Easter Bunny and Eggs, or any other three dimensional figure. The replaceable, illuminable edible is attached to a holder which is in turn attached to a base. Concealed inside the base are a light source and battery connected to an electrical switch.

The illuminable edible toy can be a simulation toy with several replaceable, illuminable edibles inside a holder having a cover simulating a variety of themes. The replaceable, illuminable edibles can be figures representing characters such as a witch, vampire, skeleton, Easter Rabbit, Santa Claus, Rudolph the Red Nosed Reindeer, Christmas tree or Frosty the Snowman. The holder can have a cover simulating a coffin or horror house for conveying horror themes, or simulating an egg shell for conveying an easter celebration theme or a cave for conveying a fairy tale mining cave theme.

The covers for the simulation themes can be hinged to open and can also have openings or smaller hinged covers or transparent portions for looking inside at the replaceable, illuminable edible character figures. The base can have a reflector for improving the luminance effect on the replaceable, illuminable edibles.

BRIEF DESCRIPTION OF THE DRAWINGS

The present invention should be more fully understood when the specification herein is taken in conjunction with the drawings appended hereto wherein:

FIG. 13 is a side view of an illuminable edible figure for the simulation toy of FIG. 6;

FIG. 14 is a front view of an illuminable edible figure for the simulation toy of FIG. 6; and FIG. 15 is a side view of an illuminable edible figure for the simulation toy of FIG. 6.

DETAILED DESCRIPTION OF THE PRESENT INVENTION

The present invention entails a toy with illuminable edibles which can be consumed by children. The illuminable edibles can be attached to a handle resembling a candy cane, ice cream cone portion or be inside a container simulating a coffin, horror house, Easter egg or mining cave, etc. The illuminable edibles are illumed to produce a brilliance or glowing effect by battery powered lights inside the handles or containers. Typically, the illuminable edibles are frictionally attached to holders in the base. The holders may be protrusions or recesses which frictionally mate with corresponding recesses or protrusions in the illuminable edibles.

The term "replaceable, illuminable edible" as used herein can mean a soft or hard crystal candy or other translucent or transparent food. These replaceable, illuminable edibles can be in the form of crystals, candy canes, ice cream cones, snow cones, eggs, Christmas trees, jack-o-lanterns, etc. or characters such as Santa Claus, a snowman, Rudolph the Red Nosed Reindeer, Easter Bunny, Frankenstein, a "wolfman", witch, vampire, etc.. The replaceable, illuminable edibles can be single colored or be of mixed colors.

The term "light permeating portion" as used herein can be a hole or opening in the base for permitting light emitted from a light source inside the base to pass through onto or into a replaceable, illuminable edible. Alternatively, the light permeating portion can be a transparent or translucent material in a top support surface of the base. The term "light source" as used herein can mean an incandescent lamp in which a filament is heated to incandescence by an electric current. "Battery" as used herein can mean an electrochemical based storage device for generating an electric current. The term "conductor" as used herein can mean an insulated or non-insulated material which provides a pathway for electric current. The term "switch" as used herein can mean a single pole single throw push button, toggle, rocker or slide-type electrical contact switch for making or breaking an electrical circuit.

The term "reflector" as used herein can mean a reflector having a shape that is flat, near parabolic or parabolic. The reflecting surface can be a polished or plated metal or plastic surface.

Figure 1:
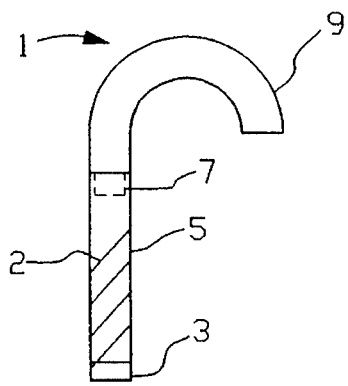
FIG. 1 is a side view of a candy cane toy with an illuminable edible portion.

Shown in FIG. 1 is a side view of an illuminable toy 1 resembling a candy cane. The illuminable edible 9 has a protrusion which is attached to a base 5 by frictional insertion into the holder 7. The base 5 is cylindrical in shape and together with the illuminable edible 9 can have red and white stripes 2 for simulating a candy cane. As shown, the base 5 and holder 7 are unistructurally formed, however, in alternative embodiments the holder may removably snap or thread onto the base.

Figure 2:
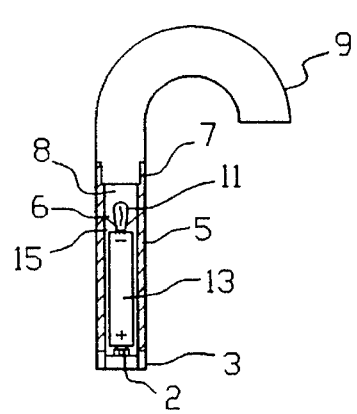
FIG. 2 is a side cut view of the candy cane toy depicted in FIG. 1.

A partially cut side view in FIG. 2 details the electrical hardware contained and concealed inside the base 5. The switch 3 is electrically connected by direct contact through spring 2 to an anode of a battery 13 and electrically connected through conductor 15 to a light source 11. The light source 11 is electrically connected by direct contact to an anode of the battery 13. The light permeating portion 8 is a continuous opening from the light source 11 end in the base 5 to the protrusion and of the illuminable edible 9. Thus, the light emitted from the light source 11 is absorbed and diffused by the illuminable edible 9 to render an illuminating or glowing effect from the illuminable edible 9. In an alternative embodiment, the holder can be fitted with a clear plastic overlay that is molded to fit over and inside the holder 7 portion of the base 5. The overlay could be removable for cleaning and reuse. Shown is an optional reflector 6 which encircles the bulb portion of the light source 11 and is attached to the base 5 under the light permeating portion 8.

The illuminable edible 9 is illuminated by turning switch 3 till spring 2 compresses sufficiently to expand and contact with conductor 15 so as to complete the electrical circuit and energize the light source 11. The energized light source 11 produces an illuminating or glowing effect on the illuminable edible 9. The illuminable edible 9 may be consumed by licking or chewing while the light source 11 is energized or de-energized. When the illuminable edible has been partially or completely consumed it may then be withdrawn from the holder 7 end of the base 5 to allow insertion of a new or similarly configured illuminable edible. In alternative embodiments, the replaceable illuminable edible 9 can be a variety of three dimensional forms such as Santa Claus, a snowman, a reindeer, a Christmas tree, etc. In a further alternative embodiment the base can be modified to appear as an ice cream cone with the illuminable edible appearing as a strawberry coated scoop of ice cream.

Figure 3:
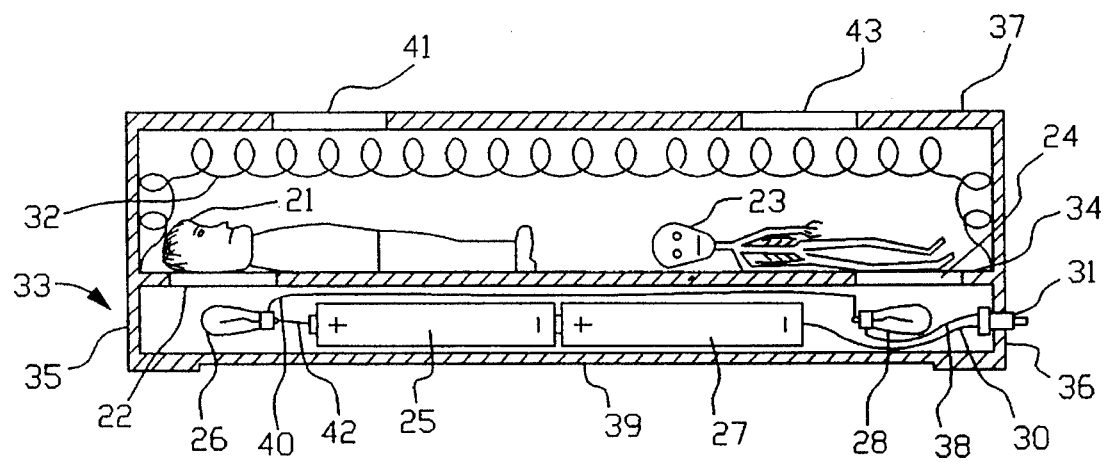
FIG. 3 is a partially cut side view of a coffin simulation toy with illuminable edibles.

FIG. 3 shows a partially cut side view of an illuminable toy simulating a coffin with horror figures. The base 33 has wall portions 35 and 36 closed off by an access cover 39 at the bottom. Inside the base 33, light source 28 is electrically connected through conductor 40 to a light source 26 and electrically connected through conductor 38 to a switch 31. Switch 31, an electrical contact switch, is electrically connected through conductor 30 to an anode of a battery 27. Battery 27 is electrically connected by direct contact to a battery 25. Light source 26 is electrically connected through conductor 42 to an anode of battery 25. The electrical circuit arrangement shown is one where the light sources are connected in series with the batteries and the switch. However, the light sources may be arranged in parallel with the batteries and the switch to allow one light source to operate if the other should fail.

The base 33 has a top surface 34 which holds or supports replaceable illuminable edibles 21, a vampire, and 23, a skeleton. The top surface 34 of the base 33 has light permeating portions 22 and 24 over the light sources 26 and 28 respectively. The cover 37 on the wall fits on the wall portions 35 and 36 of the base 33. Shown on top of the cover 37 are viewing windows 41 and 43 which can be translucent or transparent or simply openings with hinged plastic covers to allow viewing the illuminable edibles, 21 and 23, when they are illumed. The cover 37 can be removed to allow retrieval of the illuminable edibles for partial consumption. Once partially consumed, the illuminable edibles can be returned to the base 33 under the cover 37 and seen through viewing windows 41 and 43 as decomposing corpses. In alternative embodiments, a transparent or translucent viewing window or opening can be on the side of the cover to provide the view depicted by FIG. 3. Also shown is an optional plastic illuminated accessory 32 simulating a ruffle appearance inside a coffin which attains a brilliance or glowing effect when the light sources 26 and 28 are energized. Alternatively, the accessory 32 can be of a glow-in-the-dark material for a different viewing effect.

Figure 4:
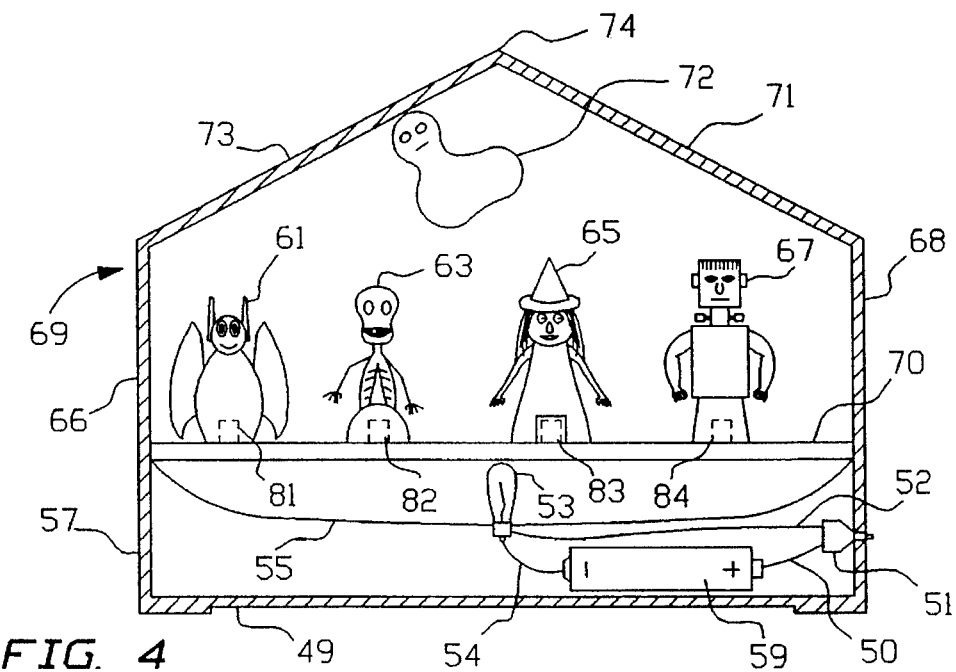
FIG. 4 is a partially cut view of a horror house simulation toy with illuminable edibles.

Shown in FIG. 4 is a partially cut side view of an illuminable toy simulating a horror house. Inside the base 57 is a light source 53 electrically connected through conductor 52 to switch 51 and electrically connected through conductor 54 to an anode of a battery 59. The switch 51 is connected through conductor 50 to an anode of battery 59. The base 57 has a removable access cover 49 and a top support surface 70 which has integrally formed protrusions 81, 82, 83, and 84 that friction fit into corresponding recesses in the replaceable, illuminable edibles 61, 63, 65 and 67 respectively. Also shown is a plastic illuminated accessory 72, attached to rooftop portion 73 simulating a flying ghost. Alternatively, the plastic accessory 72 can be a glow-in-the-dark material.

The entire top support surface 70 is a light permeating portion made of a translucent material which diffuses the incandescent light emitted by light source 53. In an alternative embodiment, the top support surface 70 can be opaque, with smaller light permeating portions under the replaceable illuminable edibles 61, 63, 65 and 67, thereby increasing the concentration of light into, and enhancing the illuminating or glowing effect of, the replaceable, illuminable edibles. Shown is an optional reflector 55 encircling the bulb portion of light source 53. The reflector 55 is attached to the base 57 under the light permeating portion of the top support surface 70.

Resting atop the base 57 walls is a cover 69 with permanently attached wall portions 66 and 68 and removable roof tops 71 and 73 which are hinged together at the ridge 74. By removing the cover 69, the illuminable edibles 61, 63, 65 or 67 can be retrieved for partial consumption or replaced by other illuminable edibles. In an alternative embodiment, the wall portions 66 and 68, removably resting atop the base 57, may be permanently attached to the rooftops 71 and 73. In such an embodiment, the rooftops 71 and 73 may have openings with hinged covers for viewing the replaceable, illuminable edibles when the light source 53 is energized by switch 51.

Figure 5:
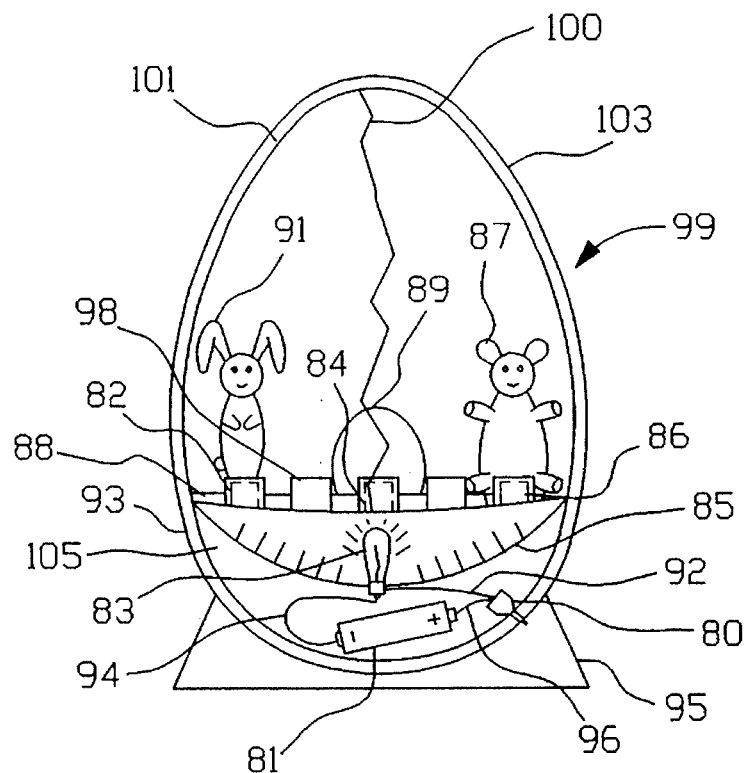
FIG. 5 is a partially cut side view of an Easter celebration simulation toy with illuminable edibles.

Shown in FIG. 5 is a partially cut side view of an Easter celebration simulation toy with illuminable edibles 91, a rabbit, 89, an egg and 87, a mouse. The base 93 is configured as an eggshell bottom resting inside a similarly configured stand 95 with a flat bottom for standing stability. The top support surface 105 of the base 93 has integrally formed holders 82, 84 and 86 in the shape of protrusions which friction fit into corresponding recesses in the replaceable, illuminable edibles 91, 89 and 87 respectively. The top support surface 105 of the base 93 is removable but remains in place by snapping into the base 93. The top support surface 105 being made of a translucent material, is also a light permeating portion permitting the light source 83 to illuminate the replaceable, illuminable edibles 87, 89 and 91. The plastic illuminated accessories 98, a picket fence, and grass 88, absorb and diffuse light emitted by the light source 83 to provide an additional illuminated glowing effect. In alternative embodiments these accessories can be illuminable edibles or glow-in-the-dark materials.

Access inside the base 93 is provided by the top support surface 105 of the base 93 being removable. The light source 83 is electrically connected through conductor 94 to an anode of a battery 81 and electrically connected through conductor 92 to a switch 80. The switch 80 is electrically connected through conductor 96 to the battery 81. Also shown is an optional reflector 85. The reflector 85 encircles the bulb portion of the light source 83 and is attached to the base 93 under the top support surface or light permeating portion 105. The eggshell cover 99 is removable from the base 93 by unsnapping cover portions 101 and 103 apart at joint 100 which simulates a crack line which extends from the base 93 just above the top support surface 105 to a top of the cover 99. Cover portions 101 and 103 longitudinally divide the cover 99 into two portions at joint 100. Alternatively, the egg shell cover 103 may be one piece which simply unsnaps from the base 93 perimeter just above the top support surface 105 or opens by way of a hinge attached to both the egg shell cover 100 and base 93. In yet a further alternative embodiment, one or two of the illuminable edibles depicted, 87, 89 and 91 can be permanent plastic figures rather than illuminable edibles.

Figure 6:
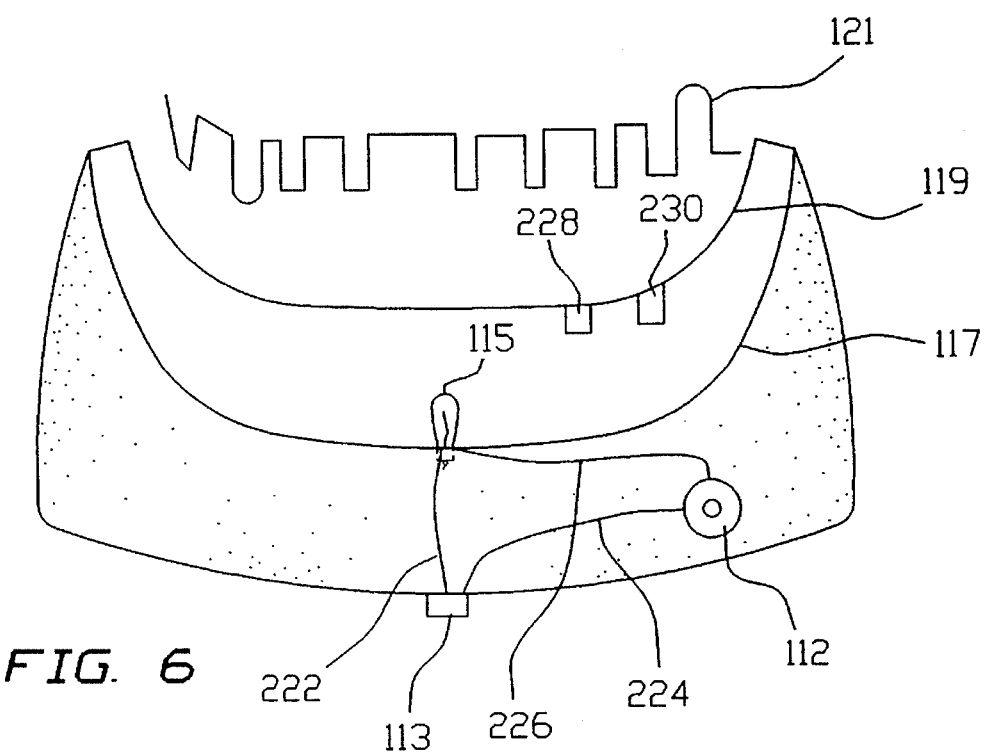
FIG. 6 is a cut away view of a base for a mining cave simulation toy with illuminable edibles.

Shown in FIG. 6 is a partially cut away view of a base 111 for a mining cave simulation toy with illuminable edibles. The switch 113 is electrically connected through conductor 224 to a battery 112 and through conductor 222 to a light source 115. The light source 115 is electrically connected through conductor 226 to the battery 112. The base has a top support surface 119 with recessed holders 228 and 230 which friction fit with protrusions 173 and 183 on replaceable illuminable edibles such as 171 and 181 respectively. (See FIGS. 14 and 15). The top support surface 119 may be an entire light permeating portion or have smaller light permeating portions.

Shown in FIG. 6 is an optional reflector 117 which encircles the bulb portion of light source 115 and is attached to the base under the light permeating portion or top support surface 119. Also shown is an optional clear plastic overlay insert 121 which is molded to fit over the top surface 119 and into the recessed holders 228 and 230. This clear plastic overlay can be washable to permit new illuminable edibles to be placed into a clean base 111. Moreover, this type of clear plastic overlay can be employed as an option in any simulation toy with illuminable edibles, including those depicted in FIGS. 3, 4, and 5.

Figure 7:
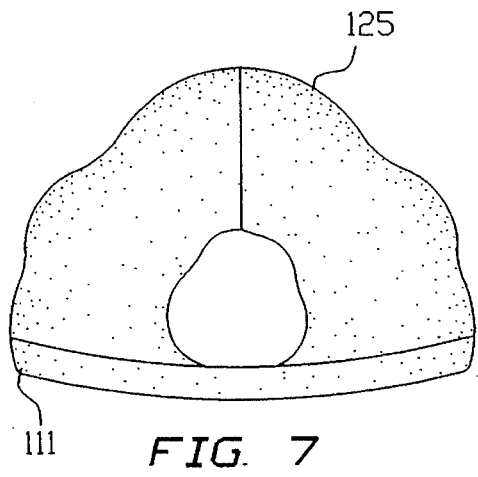
FIG. 7 is a front view of the simulation toy in FIG. 6 with a side opening cover model.

Shown in FIG. 7 is a front view of a side opening cover 125 for the base 111 detailed in FIG. 6. The outside and inside surfaces of the cover 125 may be textured to simulate rock formations in a mining cave.

Figure 8:
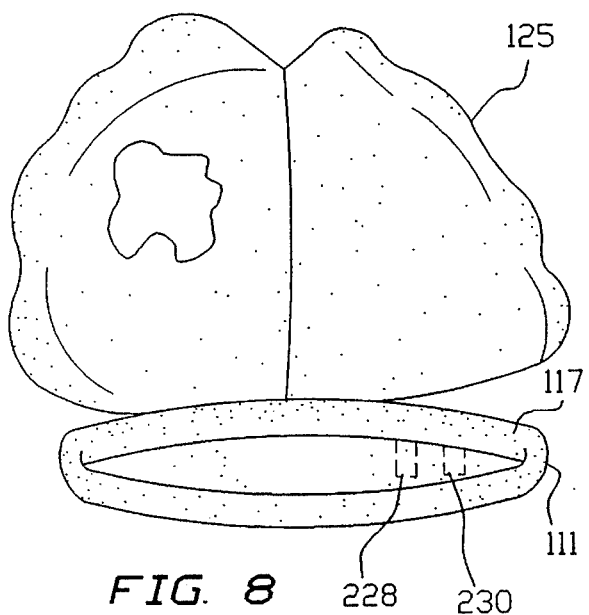
FIG. 8 is a front view of the cover in FIG. 7 with the sides open.

FIG. 8 shows how the side opening cover 125 would appear opened to provide access to any replaceable, illuminable edibles inside the cover 125.

Figure 9:
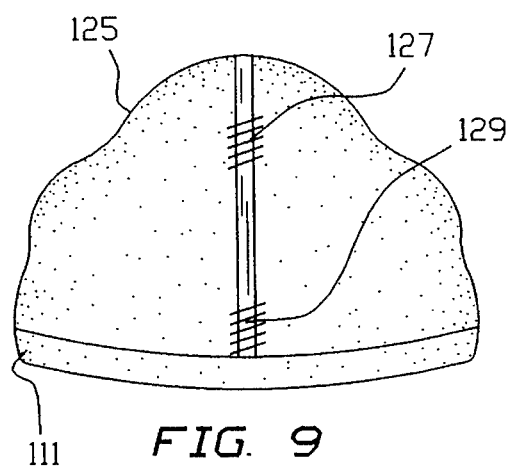
FIG. 9 is a rear view of the cover in FIGS. 7 and 8.

FIG. 9 shows a possible hinge attachment arrangement for the side opening cover of FIGS. 7 and 8. Hinge 129, attached to both sides of the cover 125 at the bottom, is also attached to the base 111. Hinge 127 is attached to both sides of the cover 125 to provide added stability. If the rear of the cover 125 is not flexible, than the two hinges 127 and 129 must be vertically aligned to properly function in unison.

Figure 10:
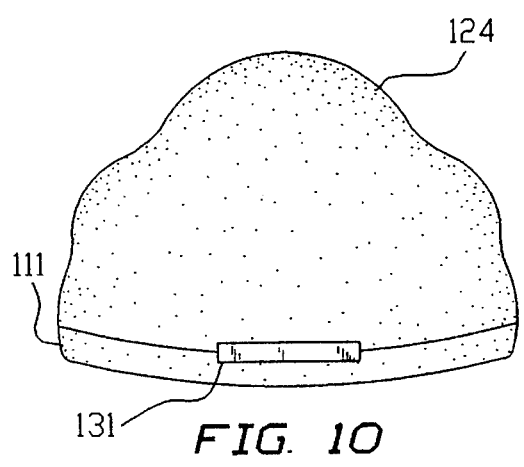
FIG. 10 is a rear view of the simulation toy in FIG. 6 with a top opening cover model.
Figure 11:
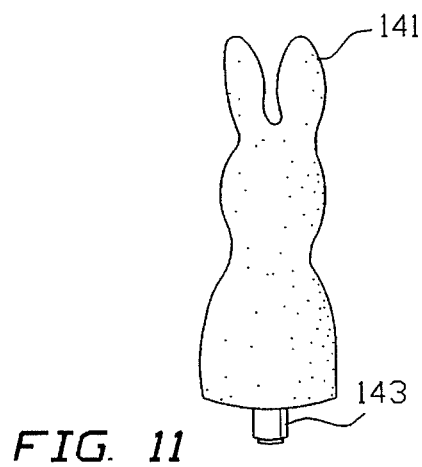
FIG. 11 is a side view of an illuminable edible figure for the simulation toy of FIG. 6.
Figure 12:
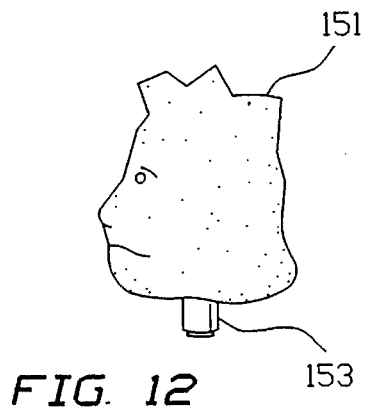
FIG. 12 is a side view of an illuminable edible figure for the simulation toy of FIG. 6.

FIG. 10 depicts a top opening cover 124 embodiment, whereby a single hinge 131 is attached to the base 111. The advantage of this embodiment over the two hinged cover version in FIG. 9, is that the cover 124 can be irregularly shaped to better simulate a mining cave and still permit the single hinge 131 to properly open and close the cover.

Depicted in FIGS. 11, 12, 13, 14 and 15 are embodiments of replaceable, illuminable edibles for the mining cave simulation toy of FIGS. 6, 7, 8, 9 and 10. Replaceable illuminable edible 141 simulates a stalagmite deposit on a cave floor. The protrusion portion 143 can be friction fitted into one of the holder recesses 228 or 230 in FIG. 8. Replaceable, illuminable edible 151 simulates a gem cluster whose protrusion 153 can be friction fitted into a recessed holder like 228 or 230 shown in FIG. 8. Replaceable, illuminable edible 161 is a translucent candy simulating a treasure which is inserted into a plastic molded treasure chest 163 with a hole 165 at the bottom that allows the protrusion 164 to be inserted into a recessed holder like 228 or 230 in FIG. 8. Replaceable, illuminable edibles, 171, a miner, and 181, a gem inspector, have protrusions 173 and 183 respectively, also being edible, which can be inserted into recessed holders like 228 and 230 shown in FIG. 8.

Obviously, numerous modifications and variations of the present invention are possible in light of the above teachings. It is therefore understood that within the scope of the appended claims, the invention may be practiced otherwise than as specifically described herein.

What is claimed is:

1. An illuminable toy comprising:
   (a) at least one light source;
   (b) at least one battery, said battery being electrically connected to said at least one light source;
   (c) a switch, said switch being electrically connected to said at least one light source and said at least one battery, said switch providing an on/off adjustment for energizing and de-energizing said at least one light source with said at least one battery;
   (d) a base, said base containing said at least one light source and said at least one battery and said switch, said base having at least one light permeating portion for allowing passage of light emitted from said at least one light source, said switch being adjustable from an exterior of said base;
   (e) at least one holder, said at least one holder being attached to said base;
   (f) at least one replaceable, illuminable edible having a three dimensional form, being attached to said at least one holder, and being illuminated by light emitted from said at least one light source; and
   (g) a cover attached to said base and covering said at least one, replaceable, illuminable edible and having a three dimensional configuration, wherein said cover and said base simulate an eggshell, said cover being divided longitudinally into two portions at a joint extending from a top of said cover to just above a top support surface of said base, said division at said joint simulating a crack line.

2. The illuminable toy of claim 1 wherein said at least one light source includes a bulb.

3. The illuminable toy of claim 2 further comprising a reflector, said reflector being attached to said base and under said at least one light permeating portion and encircling said bulb of said at least one light source.

4. The illuminable toy of claim 3 wherein said at least one replaceable, illuminable edible is a plurality of replaceable, illuminable edibles and said at least one holder is a plurality of holders.

5. The illuminable toy of claim 3 further comprising non-edible accessories, said non-edible accessories being attachable to at least one of said at least one holder, said cover and said base.

6. The illuminable toy of claim 5 further comprising plastic illuminable features being attachable to said at least one of said at least one holder, said cover and said base.

* * * * *